Patented Oct. 10, 1939

2,175,797

UNITED STATES PATENT OFFICE 2,175,797

WATERPROOF ADHESIVE COMPOSITION

Edwin O. Groskopf, Rutherford, N. J., assignor to The Patent and Licensing Corporation, New York, N. Y., a corporation of Massachusetts No Drawing. Application November 27, 1937, Serial No. 176,811

2 Claims. (Cl. 134—23.6)

This invention relates to waterproof adhesive compounds for general use and specifically for use under conditions which have heretofore presented considerable difficulty in the attainment of the desired adhesive effect. One example of the particular conditions under which the adhesive compounds, made in accordance with this invention, may be successfully employed are those which prevail in the application of sound deadening felts, floor pads and the like to the metal parts of car bodies during the course of their manufacture. In the construction of car bodies in accordance with the practice now conventionally employed, sound deadening felts, floor pads and similar materials are adhesively secured to the metal parts of the bodies and the bodies are then substantially directly subjected to high temperatures in a drying oven, the temperatures therein normally ranging from 220 to 300° F., the bodies being maintained in the oven anywhere from one quarter of an hour to three hours. The application of the adhesive is usually made by spraying or brushing the same on the metal parts.

It has been determined that the optimum requirements for an adhesive material for the above stated use are that it should be non-inflammable, non-toxic, odorless, uniformly sprayable and brushable, stable to storage even when stored in contact with zinc or other metals, provide high coverage, rapidly develop an adhesive film having a bonding strength considerably in excess of the bond required to support deadener felt both at room temperatures and when subjected shortly after application to oven temperatures as high as 300° F. The film should not flow or seriously be deteriorated by the oven temperatures and should remain non-brittle at zero temperatures and should not be seriously affected by aging.

The principal object of the present invention is to provide an adhesive material which will fulfill all the above stated requirements. A further object of the invention is to provide a rubber-asphalt adhesive material which will have the above stated properties.

An adhesive material now extensively employed in the fixing of fibrous material to metal panels under the above stated circumstances comprises bituminous emulsions of the type in which a mineral colloid, e. g. bentonite, is employed as the dispersing agent. This material is odorless, non-inflammable, and non-toxic in character and has the ability, when its water content has been substantially removed, to provide an adhesive film highly resistant to flow under heat, even at temperatures greatly exceeding the melting point of its bituminous, i. e. asphalt, content. Asphalt emulsions of this type, however, break and develop their adhesive properties under atmospheric conditions rather slowly, complete inversion of the emulsions usually requiring from 8 to 48 hours, depending upon the temperature and humidity conditions prevailing at the time of their application and on the thickness of the applied film. Because of this characteristic of such emulsions, it has been found that a sufficient amount of water of the emulsion to cause the film thereof to invert and take on an adhesive condition has not escaped before temperatures sufficiently high to convert the water of the emulsion into steam are reached in the passage of the united film and metal layers through the high temperatures in the oven. Consequently there is a lack of sufficient adhesion between the fibrous material layer and the metal layer to prevent blowing off or forcing away of the fibrous material from the metal when temperatures of the order of 212° F. are reached. These bituminous emulsions have the further disadvantage that they must be applied in a relatively thick layer to obtain sufficient adhesive strength, for example two and one-half to three gallons of the emulsion is necessary to cover 100 square feet of the metal if a sufficiently strong adhesion between the metal and the fibrous material is to result.

The use of rubber dispersions, e. g. natural rubber latex and artificial dispersions of reclaimed rubber, have also been proposed for the cementing of sound deadening pads under the above described conditions. These rubber dispersions, however, have not met with any considerable success due to their odor, instability to metal, poor adhesion, relatively poor aging qualities and comparatively high cost.

It has also heretofore been proposed to use rubber cements, i. e. rubber cut-back with a suitable rubber solvent, particularly for the cementing of floor pads. Rubber cements exhibit the advantage that they develop an adhesive strength very quickly and wet fabric better than does water thus producing a more superior fabric to metal bond. Rubber cement may also be easily applied by spraying the cement in relatively thin layers. Rubber cements are, however, expensive, highly inflammable and/or toxic.

Bituminous emulsions of the type in which soaps are employed as the dispersing agent have heretofore been considered in connection with the cementing of sound deadening pads or the like to metal car parts. These emulsions provide a film which coalesces more rapidly than the clay type emulsion due to their relatively low water content and to their soap structure offering less resistance to the flowing of the asphalt constituent than does bentonite or the like. These emulsions have heretofore, however, proved entirely unsatisfactory due to the fact that dry films thereof flow under temperatures such as occur in the automotive plant ovens and also under summer temperatures. The soap emulsifier also causes the emulsion to foam when under the oven temperatures and furthermore there is a tendency for the emulsion to be drawn through the felt by capillary action before the film thereof has set.

According to the present invention, soap emulsions of the type referred to above and having the advantages stated for them are employed as the base material to which is added certain other compounds and ingredients to modify the soap emulsion to eliminate the several disadvantages thereof. Thus, according to the invention, an emulsion of asphalt, coal tar, rosin, cumar resin or similar thermo-plastic waterproofing substances is made employing from $\frac{1}{5}$ to 1.2% of a soap emulsifier, the emulsion containing from 16 to 20% of water content. To the emulsion is added a small amount of clay in the form of a clay slip, i. e. a weak solution of clay in water. The clay functions to improve the body and spraying characteristics of the emulsion. That is, it increases the suspendability of the asphalt or the like in the water; it also serves as a stabilizer for the emulsion to a minor extent. Principally, however, the clay serves to prevent flow of the film deposited from the emulsion when the film is subjected to high temperatures, for example those which occur in the drying ovens of automotive plants. The clay does not produce any further emulsification and does not exist in contact with the asphalt particle, as in the case where the clay is used as an emulsifier, the soap film apparently preventing the clay from stabilizing the asphalt particles to any substantial extent. The clay, however, serves to lubricate and maintain the system in suspension so that the product is more velvety in texture and more uniform and attractive in body. It also lowers the surface tension of the system so that upon spraying of the material, it atomizes extremely fine and deposits in a very even film. The addition of from 1.3 to 1.6% of the clay by weight of the whole has been found to be most effective for the purposes of the present invention as this amount of clay added to the soap emulsion has been found sufficient to prevent the film from flowing under high oven temperatures.

In order that the adhesive material should have the desired elasticity and bonding strength and to give it the appearance of a good rubber cement, a suitable quantity of a rubber dispersion is added thereto. The rubber dispersion may be either natural, i. e. latex, or artificial, i. e. an aqueous dispersion of reclaimed rubber. Dispersions of rubber cement are also suitable for use in the present invention. It has been determined, however, that equal parts of an artificial dispersion of reclaimed rubber and of latex to provide a total rubber content of say 6% by weight of the whole may be preferably employed. In order that the rubber of the dispersions be miscible with the thermo-plastic constituent of the emulsion where the same comprises ordinary commercial grades of black asphalt, coal tar or the like, a suitable plasticizer may be necessary. The plasticizer may comprise albino asphalt, cumar resin and similar thermo-plastic material low in asphaltenes. If desired, albino asphalt, cumar resin or the like may be employed as the entire asphaltic constituent of the emulsion and in this case no further plasticizer is necessary. However, in view of the relatively high cost of albino asphalt and cumar resin as compared to ordinary black asphalt, coal tar and the like, it is preferable that a major portion of the latter be employed and the proportion of albino asphalt or other plasticizer be as low as possible to provide the desired miscibility of the black asphalt or coal tar and rubber. For example, as little as 35% of albino asphalt based on the weight of the total asphalt content proves satisfactory for the purposes of the present invention.

In order that the emulsion may be sufficiently stable to permit it to be stored in contact with zinc or the like such as the zinc containers employed in the automotive plants, suitable emulsion stabilizers may be added thereto in the desired proportions determined by the periods of storage necessary. Such stabilizers may be suitable colloids, e. g. casein, or alkalies such as potassium hydroxide.

The adhesive material in accordance with the invention and as described above exhibits all of the advantages of soap emulsions as previously proposed but none of the disadvantages thereof and meets all of the requirements of an optimum adhesive material. Thus, it is non-inflammable, practically odorless, non-toxic, uniformly sprayable and brushable, and stable to storage in contact with zinc or other metals. It has high coverage properties, it breaks very rapidly to deposit on adhesive film and it has excellent adhesive and cohesive bonding strength even after subjection to temperatures as high as 300° F., the elastic rubber quality of the film being apparently uninjured by this temperature. Moreover, an adhesive compound in accordance with the present invention is of relatively low cost as compared to rubber cements, rubber dispersions and the like.

As one specific example of an adhesive material of the present invention, the material may comprise an emulsion of a fifty-fifty blend of albino and black asphalts, the combined asphaltic content comprising 48.16 parts by weight of the whole. To the emulsion a quantity of a dispersion of reclaimed rubber is added such that the rubber content thereof comprises 5.39 parts and the reclaim rubber filler, 2.67 parts by weight of the completed mixture. Colloidal clay in the form of a thin slip to an amount of 1.59 parts is stirred into the relatively thin mass. As above stated, the clay does not produce any further emulsification but serves to lubricate the system and to lower the surface tension of the same and to prevent flow under heat of a film deposited from the same. A suitable amount, say 0.5 part by weight of the material, of potassium oxylate or equivalent material is added to insolubilize any bivalent or trivalent irons present in the clay which would tend to destabilize the soap emulsion system. The stability of the emulsion can be regulated, if desired, for example to permit storage of the material in contact with zinc without breaking, by adding additional soap, casein, alkali or the like in the amounts say of 0.76 part of the whole. The remaining parts of the adhesive material comprise the water of the aqueous phases of the bitumen and rubber dispersions and the water of the clay slip, said water content constituting in all 41.16 parts by weight of the material. After the several elements of the composition are added or, if desired, upon the addition of each of the elements, the composition is stirred to homogeneity.

The adhesive material of the specific example given above fulfills all requirements of an optimum adhesive for the purposes of bonding felt, sound deadening pads and the like to the metal parts of car bodies as well as for general usage. Thus the material has been found by actual tests to adhere well to metal panels and the like even when the same is subjected to high temperatures of say 300° F. shortly after the application of the felt to the metal. The rebonding quality of the adhesive was found to be good, its cohesive quality fair and its elastic qualities excellent.

As a further specific example of an adhesive material in accordance with the present invention, the same may comprise as parts by weight of the whole:

|  | Parts |
|---|---|
| Albino asphalt | 19.70 |
| Black asphalt or similar waterproofing thermo-plastic substance | 19.70 |
| Reclaimed rubber of a dispersion thereof | 8.77 |
| Reclaimed rubber filler | 4.38 |
| Clay of a clay slip | 1.32 |
| Casein stabilizer | 0.18 |
| 100% B rosin soap | 0.58 |
| 100% potassium oxide | 0.27 |
| 100% potassium oxylate | 0.04 |
| Water | 45.06 |

An adhesive material having the above stated formula exhibits a somewhat greater adhesive strength than that of the first example given and has similar qualities with respect to rebonding, cohesion and elasticity.

A still further example of an adhesive material in accordance with the present invention is one comprising:

|  | Parts |
|---|---|
| Albino asphalt | 23.93 |
| Black asphalt or similar thermo-plastic material | 23.93 |
| Latex rubber of a dispersion thereof | 2.63 |
| Reclaimed rubber of a dispersion thereof | 2.65 |
| Reclaimed filler | 1.33 |
| Clay of a clay slip | 1.56 |
| 100% B rosin soap | 0.70 |
| Casein | 0.21 |
| Formaldehyde | 0.24 |
| Potassium hydroxide | 0.33 |
| Potassium oxylate | 0.05 |
| Water | 42.41 |

An adhesive material of the above formula exhibits an adhesive strength intermediate of those of the previous examples, has similar qualifications with respect to rebonding properties, exhibits superior cohesive qualities and excellent elastic properties.

It will be understood that the above examples are given for the purposes of illustration only and that variations and changes may be made in the specific formulae of the adhesive materials to provide the particular qualifications desired without departing from the scope of the invention as defined by the subjoined claims.

What I claim is:

1. A cementing composition free of inflammable and toxic constituents, substantially odorless and being uniformly sprayable and brushable, said composition comprising an aqueous emulsion containing approximately 40 to 45% of an adhesive thermoplastic material, approximately 0.8 to 1.2% of soap as the emulsifying agent for the thermoplastic material, approximately 1.3% of clay whereby to inhibit flow under heat of a dried film deposited from the composition without impairing the rapid setting properties of the wet film, and approximately 6 to 9% of rubber in dispersed form whereby to impart elasticity and increased bonding strength to the dried film of the composition, said thermoplastic material consisting of approximately equal parts by weight of asphalt not readily miscible with rubber and a material selected from the group consisting of cumar resin, albino asphalt and asphalts low in asphaltenes whereby to render the first named asphalt component of the thermoplastic material miscible with said rubber.

2. A cementing composition free of inflammable and toxic constituents, substantially odorless and being uniformly sprayable and brushable, said composition comprising an aqueous emulsion containing approximately 40 to 45% of an adhesive thermoplastic material, approximately 0.8 to 1.2% of soap as the emulsifying agent for the thermoplastic material, approximately 1.3% of clay whereby to inhibit flow under heat of a dried film deposited from the composition without impairing the rapid setting properties of the wet film, and approximately 6% of rubber in dispersed form whereby to impart elasticity and increased bonding strength to the dried film of the composition, said thermoplastic material consisting of approximately equal parts by weight of asphalt not readily miscible with rubber and a material selected from the group consisting of cumar resin, albino asphalt and asphalts low in asphaltenes whereby to render the first named asphalt component of the thermoplastic material miscible with said rubber, said dispersed rubber comprising approximately equal parts by weight of rubber latex and an aqueous dispersion of reclaim rubber.

EDWIN O. GROSKOPF.